US011775007B2

(12) United States Patent
Wen et al.

(10) Patent No.: US 11,775,007 B2
(45) Date of Patent: Oct. 3, 2023

(54) PICK-AND-PLACE MECHANISM FOR STYLUS

(71) Applicant: Acer Incorporated, New Taipei (TW)

(72) Inventors: Chun-Hung Wen, New Taipei (TW); Chun-Hsien Chen, New Taipei (TW); Hui-Ping Sun, New Taipei (TW); Yen-Chou Chueh, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 17/824,876

(22) Filed: May 25, 2022

(65) Prior Publication Data
US 2023/0097723 A1 Mar. 30, 2023

(30) Foreign Application Priority Data
Sep. 24, 2021 (TW) .................................. 110135493

(51) Int. Cl.
*G06F 3/033* (2013.01)
*G06F 1/16* (2006.01)
*G06F 3/0354* (2013.01)

(52) U.S. Cl.
CPC ........ *G06F 1/1607* (2013.01); *G06F 3/03545* (2013.01)

(58) Field of Classification Search
CPC ........ G06F 1/16; G06F 1/1607; G06F 1/1613; G06F 1/1615; G06F 1/1616; G06F 1/1633; G06F 1/1658; G06F 1/1675; G06F 1/1684; G06F 1/169; G06F 3/03545; G06F 2200/1632; H05K 5/02; F03G 7/06; F03G 7/065; E05B 51/005

USPC ..................................................... 361/679.4
See application file for complete search history.

(56) References Cited

U.S. PATENT DOCUMENTS

| 6,129,430 | A * | 10/2000 | Wu ........................ G06F 1/1616 312/223.2 |
| 8,902,583 | B2 * | 12/2014 | Cheng .................. G06F 3/03545 403/374.1 |
| 2002/0190823 | A1 * | 12/2002 | Yap ..................... G06F 3/03545 335/205 |
| 2004/0068985 | A1 * | 4/2004 | Mernoe ................. A61M 5/142 60/527 |
| 2007/0188479 | A1 * | 8/2007 | Wang .................... G06F 1/1626 345/179 |

(Continued)

FOREIGN PATENT DOCUMENTS

CN 110825170 B * 5/2021 ........... G06F 1/1616

*Primary Examiner* — Adrian S Wilson
*Assistant Examiner* — Gage Crum
(74) *Attorney, Agent, or Firm* — JCIPRNET (57) ABSTRACT

A pick-and-place mechanism for a stylus, applicable for a portable electronic device, is provided. The portable electronic device has a housing. The pick-and-place mechanism for the stylus includes a moving member, a latch assembly, and a switch element. The moving member is movably disposed in the housing. The stylus is adapted to be inserted into the housing and locked with the moving member to move synchronously. The latch assembly is disposed in the housing and switches between a lock state and an unlock state. In the lock state, the latch assembly locks the stylus in the housing. In the unlock state, the latch assembly moves at least part of the stylus out of the housing. The switch element is electrically connected to the latch assembly to drive the latch assembly to switch between the lock state and the unlock state.

11 Claims, 10 Drawing Sheets

(56) References Cited

U.S. PATENT DOCUMENTS

| | | | |
|---|---|---|---|
| 2012/0140409 A1* | 6/2012 | Minaguchi | G06F 1/1616 |
| | | | 361/679.55 |
| 2013/0002964 A1* | 1/2013 | Kodaira | G06F 1/1643 |
| | | | 348/731 |
| 2014/0193193 A1* | 7/2014 | Wikander | G06F 1/1679 |
| | | | 403/322.1 |
| 2015/0035809 A1* | 2/2015 | Kim | G06F 3/03545 |
| | | | 345/179 |
| 2015/0156290 A1* | 6/2015 | Amit | H04M 1/026 |
| | | | 345/179 |
| 2016/0087666 A1* | 3/2016 | Lei | H04B 1/3818 |
| | | | 455/558 |
| 2016/0190839 A1* | 6/2016 | Otsuka | G06F 1/266 |
| | | | 320/115 |
| 2019/0278390 A1* | 9/2019 | Chiang | G06F 1/1607 |
| 2023/0037203 A1* | 2/2023 | Yu | G06F 3/0202 |

* cited by examiner

PICK-AND-PLACE MECHANISM FOR STYLUS

CROSS-REFERENCE TO RELATED APPLICATION

This application claims the priority benefit of Taiwan application serial no. 110135493, filed on Sep. 24, 2021. The entirety of the above-mentioned patent application is hereby incorporated by reference herein and made a part of this specification.

BACKGROUND

Technical Field

The disclosure relates to a pick-and-place mechanism, and in particular to a pick-and-place mechanism for a stylus.

Description of Related Art

With the development of touch display technology, touch display screens have been widely applied in smart phones, tablet computers, notebook computers, or other electronic devices. In order to improve the touch accuracy of the user operating the touch display screen and assist in the execution of precise drawing and writing actions, the stylus has been proposed. In addition, in order to improve the convenience of carrying the stylus and avoid losing the stylus, most of the smart phones, tablet computers, notebook computers, or other electronic devices are provided with slots for the user to retrieve or store the stylus.

Generally speaking, during the process of retrieving the stylus, the user must grasp the tail end of the stylus exposed from the slot with his fingers, and then pull out the stylus by force, so the operation is neither convenient nor smooth. Alternatively, the stylus can be smoothly removed from the housing of the electronic device by the user performing repeated pressing actions. The former obviously reduces the degree of operation, while the latter obviously has the possibility of mistouch.

SUMMARY

The disclosure provides a pick-and-place mechanism for a stylus, which is applicable for a portable electronic device, and improves the convenience of the user during picking and placing through an electrical control manner to effectively prevent the occurrence of mistouch.

A pick-and-place mechanism for a stylus of the disclosure is applicable for a portable electronic device. The portable electronic device has a housing. The pick-and-place mechanism for the stylus includes a moving member, a latch assembly, and a switch element. The moving member is movably disposed in the housing. The stylus is adapted to be inserted into the housing and locked with the moving member to move synchronously. The latch assembly is disposed in the housing and switches between a lock state and an unlock state. In the lock state, the latch assembly locks the stylus in the housing. In the unlock state, the latch assembly moves at least part of the stylus out of the housing. The switch element is electrically connected to the latch assembly to drive the latch assembly to switch between the lock state and the unlock state.

Based on the above, in the pick-and-place mechanism, the switch element is electrically connected to the latch assembly, so that the user can control the latch assembly through the switch element to be switched between the lock state and the unlock state. Accordingly, the user can perform corresponding operations according to usage requirements. When in the lock state, the stylus can be submerged in the housing to achieve the required immediacy and protection, and prevent the stylus from falling out of the housing when not required due to mistouching by the user. Correspondingly, in the unlock state, the user uses the switch element to drive the latch assembly to move at least part of the stylus out of the housing, so that the user can smoothly hold and take out the stylus without being interfered by the surrounding structure of the housing, thereby enabling the processes of picking and placing to be convenient.

DETAILED DESCRIPTION OF DISCLOSED EMBODIMENTS

Figure 1:
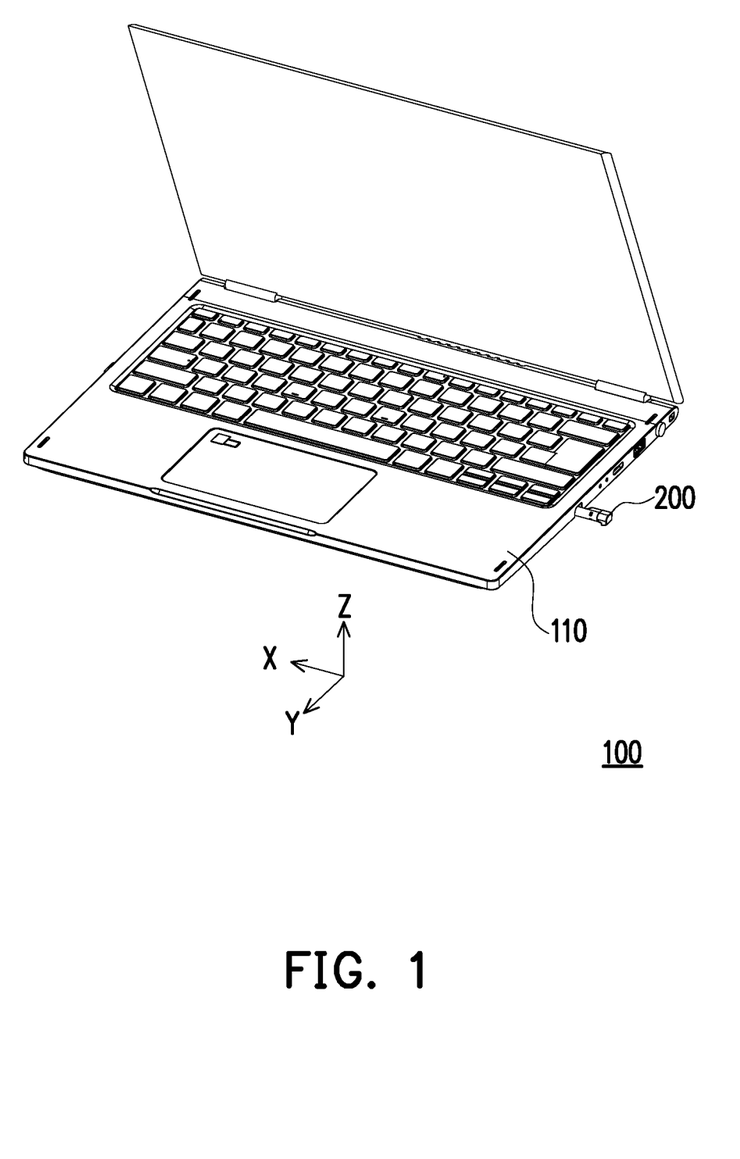
FIG. 1 is a schematic view of a portable electronic device according to an embodiment of the disclosure.
Figure 2:
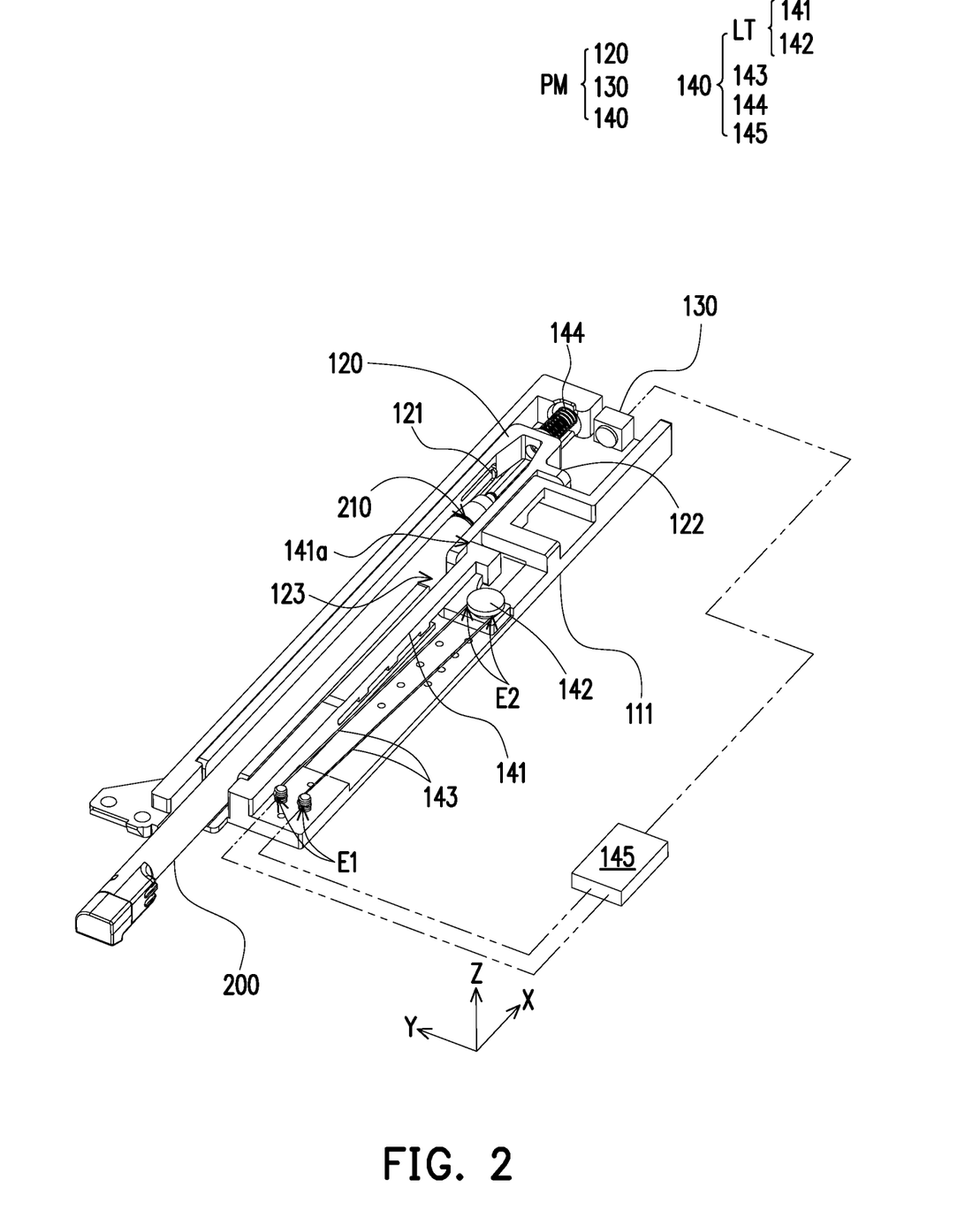
FIG. 2 is a schematic view of a pick-and-place mechanism according to an embodiment of the disclosure.
Figure 3:
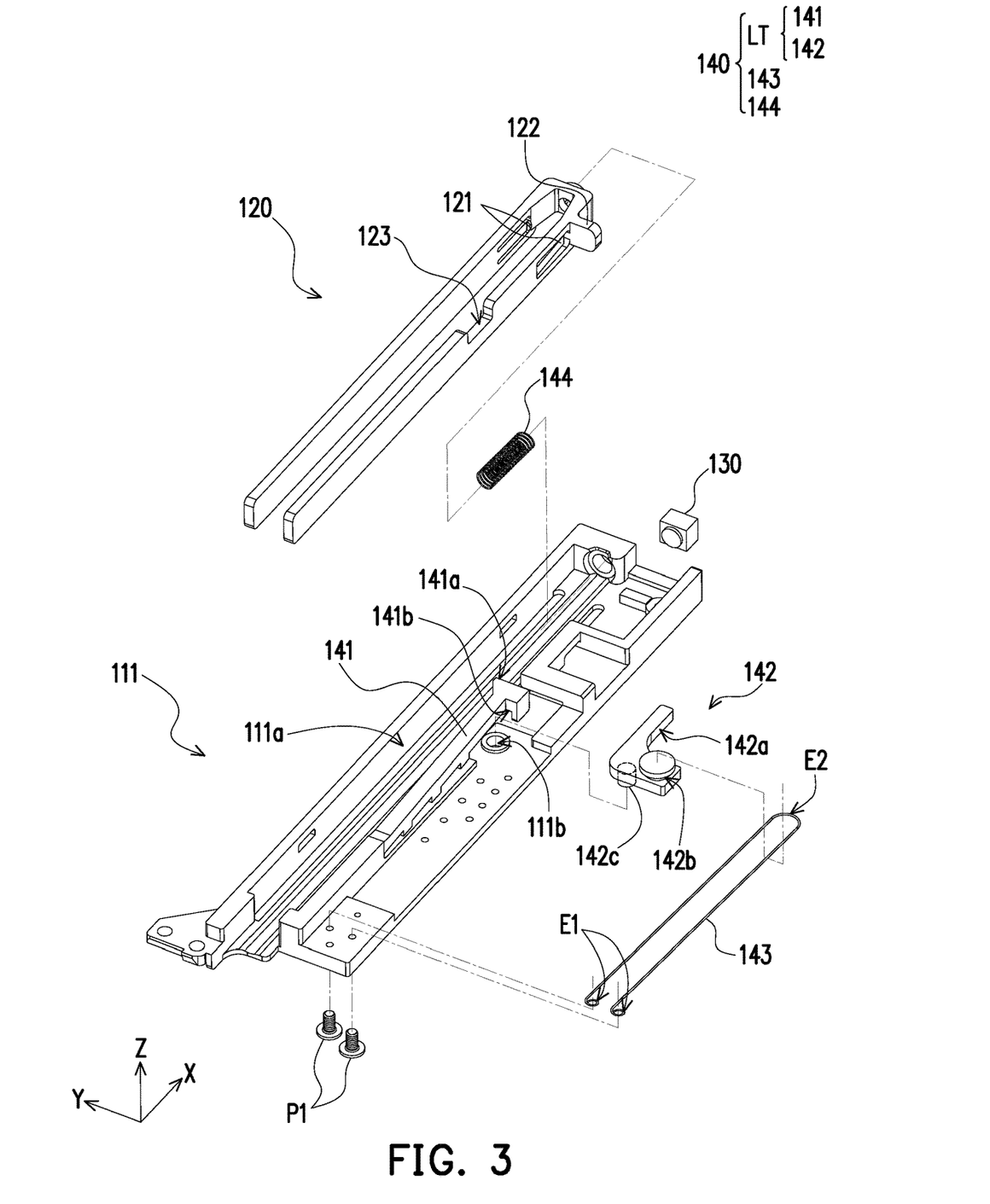
FIG. 3 is an exploded view of the pick-and-place mechanism of FIG. 2.

FIG. 1 is a schematic view of a portable electronic device according to an embodiment of the disclosure. FIG. 2 is a schematic view of a pick-and-place mechanism according to an embodiment of the disclosure. FIG. 3 is an exploded view of the pick-and-place mechanism of FIG. 2. Cartesian coordinates XYZ are provided here to facilitate description of components. Please refer to FIG. 1 to FIG. 3 at the same time. In the embodiment, the pick-and-place mechanism for a stylus (hereinafter referred to as a pick-and-place mechanism PM) is applicable for a portable electronic device 100, which is exemplified as a notebook computer here, but not limited thereto. The portable electronic device 100 has a housing 110, and the inside of the housing 110 has a base 111 to serve as a setting reference for a storage space of a stylus 200 and relevant mechanisms. The pick-and-place mechanism PM includes a moving member 120, a latch assembly 140, and a switch element 130. The moving member 120 is movably disposed on the base 111 in the housing 110. The stylus 200 is adapted to be inserted into the housing 110 and locked with the moving member 120, so that the stylus 200 and the moving member 120 move synchronously on the base 111. The latch assembly 140 is disposed in the housing 110 and switches between a lock state and an unlock state. In the lock state, the latch assembly 140 locks the stylus 200 in the housing 110. In the unlock state, the latch assembly 140 moves at least part of the stylus 200 out of the housing 110 (may refer to FIG. 1). The switch element 130 is electrically connected to the latch assembly 140 to drive the latch assembly 140 to switch between the lock state and the unlock state.

In detail, please refer to FIG. 2 and FIG. 3 again. The moving member 120 is movably coupled to a track 111a of the base 111. A front wall of the moving member 120 moves on the track 111a along an X-axis and abuts against an inner wall of the base 111 through an elastic member 144. The moving element 120 has a baffle 122 extending toward a negative Y-axis direction, and the switch element 130 is disposed on the base 111 and is located on a moving path of the baffle 122. The moving member 120 also has a hook 121 adjacent to the baffle 122, so that the stylus 200 may be locked by the hook 121 after being moved into the housing 110. The hook 121 locks at a circular recess 210 (as shown in FIG. 2) of the stylus 200.

Furthermore, the latch assembly 140 of the embodiment includes an engaging member LT, a power supply element 145, a memory alloy wire 143, and the elastic member 144. The engaging member LT is movably disposed in the housing 110 and is located on the moving path of the moving member 120. The power supply element 145 is disposed in the housing 110 and is electrically connected to the switch element 130. One end E2 of the memory alloy wire 143 is connected to the engaging member LT, other end E1 thereof is fixed to the base 111 of the housing 110 through a locking member P1, and the memory alloy wire 143 can be further electrically connected to the power supply element 145. Accordingly, the memory alloy wire 143 is energized due to the switch element 130 activating the power supply element 145, so as to be heated to change the length, and the change in length can drive the engaging member LT to be locked with the moving member 120 to reach the lock state or move the engaging member LT away from the moving member 120 to reach the unlock state.

Furthermore, the engaging member LT of the embodiment includes an elastic arm 141 and a driving unit 142. The driving unit 142 is pivoted to a pivot hole 111b of the base 111 through a shaft portion 142c thereof, and the driving unit 142 has an L-shaped structure and two driving ends 142a and 142b. The driving end 142b is connected to the memory alloy wire 143. Here, the memory alloy wire 143 is exemplified as being sleeved onto the driving end 142b with a necked structure. The driving end 142a passes through a recess 141b of the elastic arm 141 and abuts against the elastic arm 141 in structure. In this way, the driving unit 142 can rotate relative to the base 111 along a Z-axis, so that the driving end 142a thereof can drive the elastic arm 141. It should be noted that the materials of the housing 110 and the base 111 of the embodiment are, for example, plastic. Therefore, the cantilever structure (that is, the elastic arm 141) extended from the base 111 has considerable elasticity to enable the deformation thereof to be reflected on the movement of an end hook 141a. Accordingly, when the length of the memory alloy wire 143 is changed, for example, when the length is shortened, the memory alloy wire 143 can pull the driving end 142b to rotate the driving unit 142, thereby enabling the driving end 142a to drive the end hook 141a of the elastic arm 141 to move into or out of a lock hole 123 of the moving member 120.

Figure 4A:
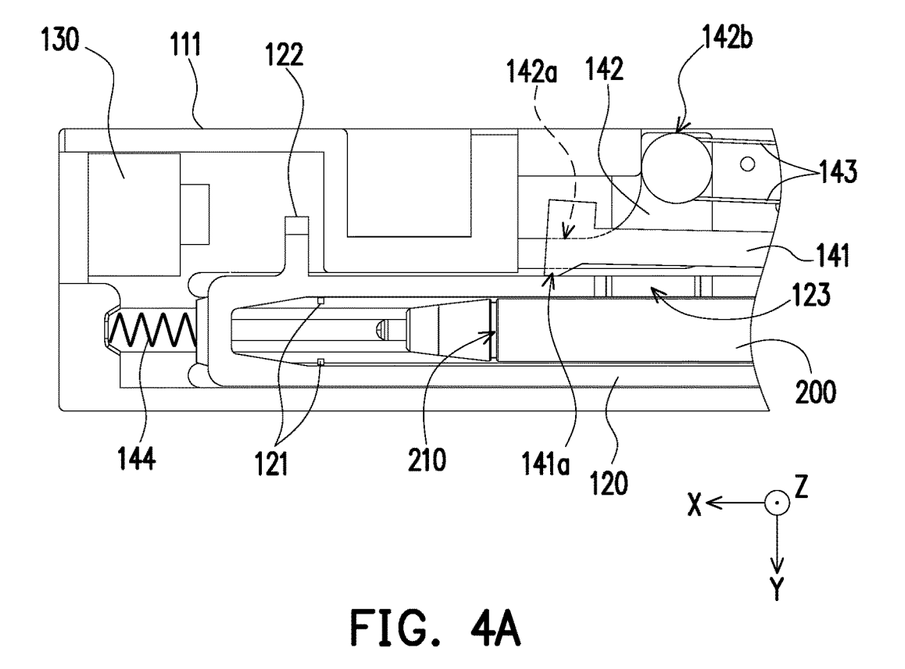
FIG. 4A to FIG. 4E illustrate a pick-and-place process of the stylus with partial enlarged views.
Figure 4B:
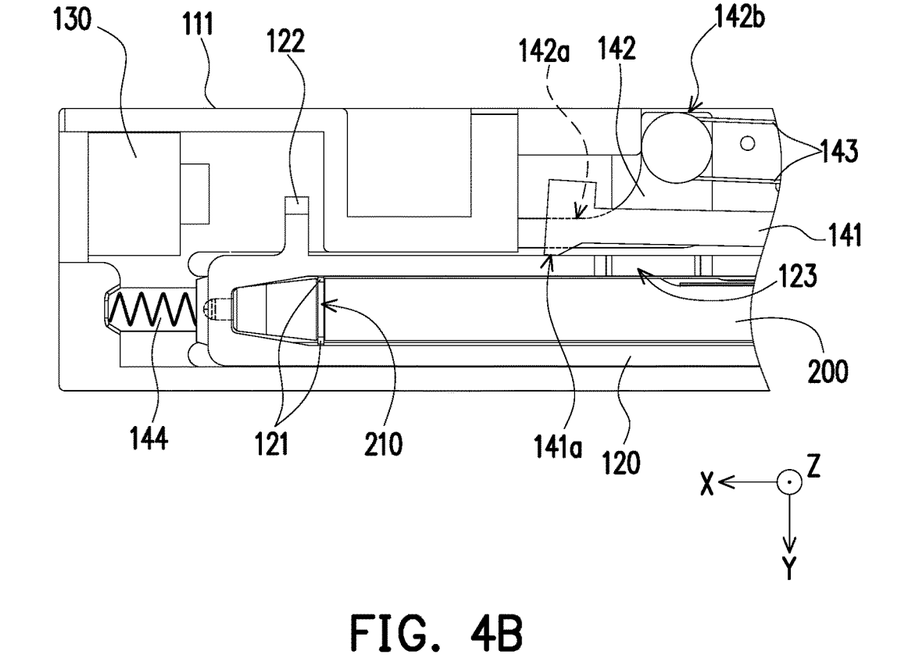

FIG. 4A to FIG. 4E illustrate a pick-and-place process of the stylus with partial enlarged views. Please refer to FIG. 4A to FIG. 4C, which illustrate the relevant steps when the stylus 200 is moved into the housing 110. In FIG. 4A, the moving member 120 is pushed by the elastic member 144 away from the inner wall of the base 111, so that the end hook 141a of the elastic arm 141 that has not yet fallen into the lock hole 123 is in a deformed state due to the interference of the moving member 120. Then, as shown in FIG. 4B, when the stylus 200 is continuously moved in (the user continues to apply force to move the stylus 200 into the housing 110), the circular recess 210 of the stylus 200 is locked by the hook 121 of the moving member 120, so that the moving member 120 can move toward a positive X-axis direction synchronously with the stylus 200.

Figure 4C:
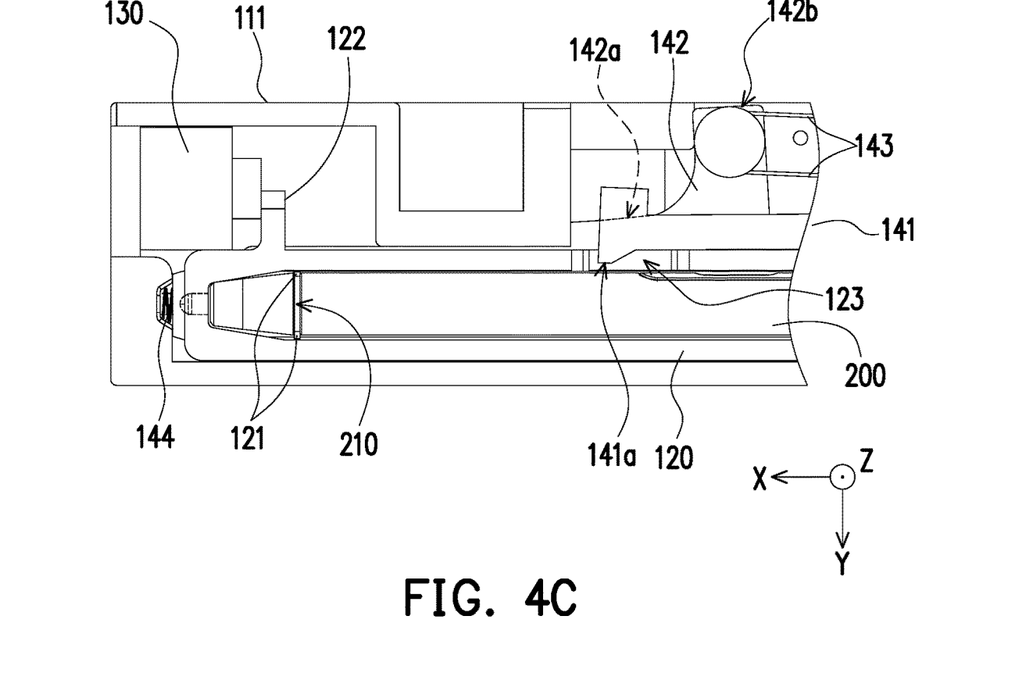

In FIG. 4C, the stylus 200 and the moving member 120 continue to move synchronously toward the positive X-axis direction until the stylus 200 and the moving member 120 reach the bottom, that is, the front wall of the moving member 120 substantially abuts against the inner wall of the base 111 (both are located on the left side in FIG. 4C. At this time, the baffle 122 of the moving element 120 is abutting against and triggering the switch element 130. More importantly, at this time, the end hook 141a of the elastic arm 141 is not blocked by the moving member 120 in structure and can fall into the lock hole 123 of the moving member 120, and the elastic member 144 is pressed between the inner wall of the base 111 and the front wall of the moving member 120, so as to be deformed to accumulate an elastic force F1.

Figure 4D:
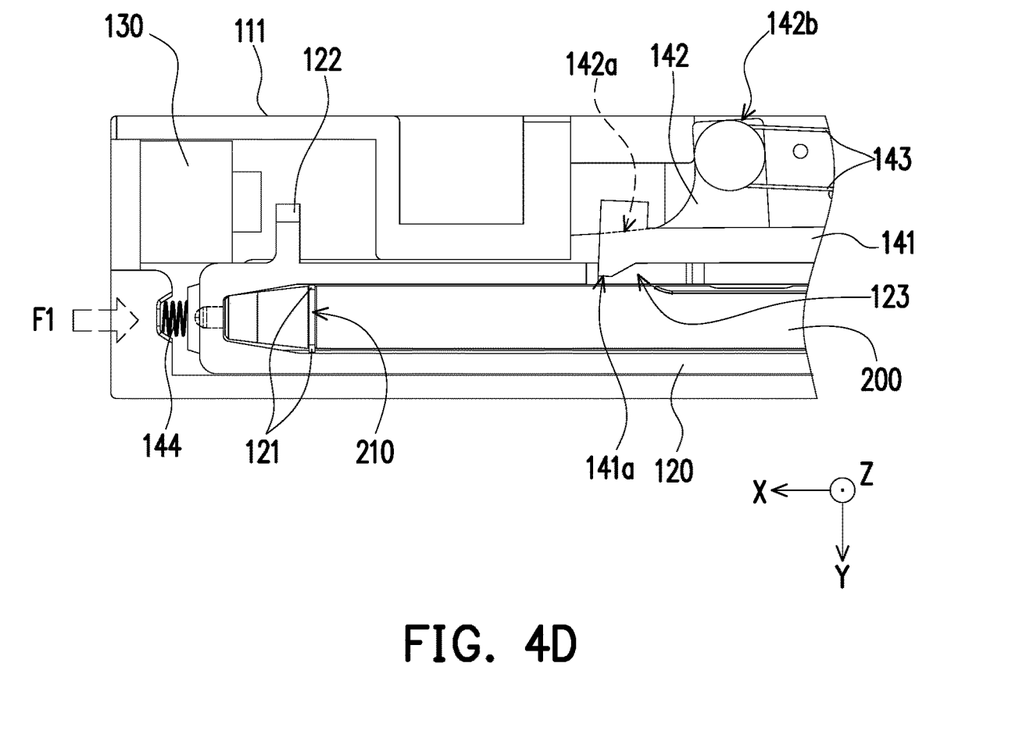

Next, please refer to FIG. 4D. The user releases the pushing force of moving the stylus 200 into the housing 110, so the elastic force F1 accumulated by the elastic member 144 drives the moving member 120 to move toward a negative X-axis direction. However, since the end hook 141a of the elastic arm 141 has fallen into the lock hole 123, the moving member 120 interferes with the elastic arm 141 along the X-axis, so that the moving member 120 and the stylus 200 thereon are maintained in the position shown in FIG. 4D, which is the lock state of the latch assembly 140.

Figure 4E:
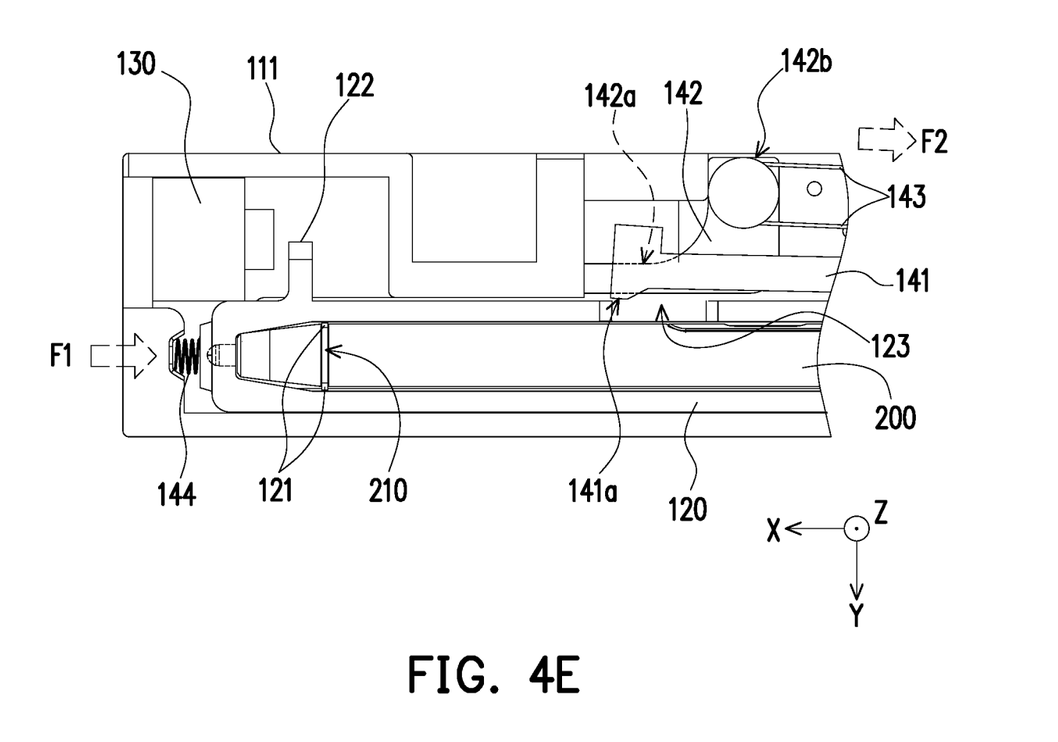

Finally, please refer to FIG. 4E. When the stylus 200 is to be taken out of the housing 110, the user only needs to press the switch element 130 again, that is, press the stylus 200 again, so that the stylus 200 and the moving member 120 move synchronously to the position shown in FIG. 4C again, that is, let the moving member 120 pass through the baffle 122 and trigger the switch element 130 again, so that the switch element 130 may energize and heat the memory alloy wire 143 through the power supply element 145. In this way, the length of the memory alloy wire 143 is changed (for example, shortened) due to energization and heating, thereby generating a tensile force F2 to further drive (rotate) the driving unit 142, so that the driving end 142a of the driving unit 142 drives the elastic arm 141 to deform, and the end hook 141a is moved away from the lock hole 123, as shown in FIG. 4E, which is the unlock state of the latch assembly 140 (the interference between the elastic arm 141 and the moving member 120 along the X-axis has been released). Therefore, the moving member 120 and the stylus 200 thereon can be driven by the elastic force of the elastic member 144 to continue to move toward the negative X-axis direction, so that at least part of the stylus 200 is moved out of the housing 110, which may refer to the state shown in FIG. 1. Therefore, that the user can smoothly hold and pick up the stylus 200.

It should be noted that persons skilled in the art can set the timing of triggering the switch element 130 by a control chip or relevant control electronic elements (not shown) to comply with the timing of the action of energizing and heating the memory alloy wire 143 in FIG. 4A to FIG. 4E.

Figure 5:
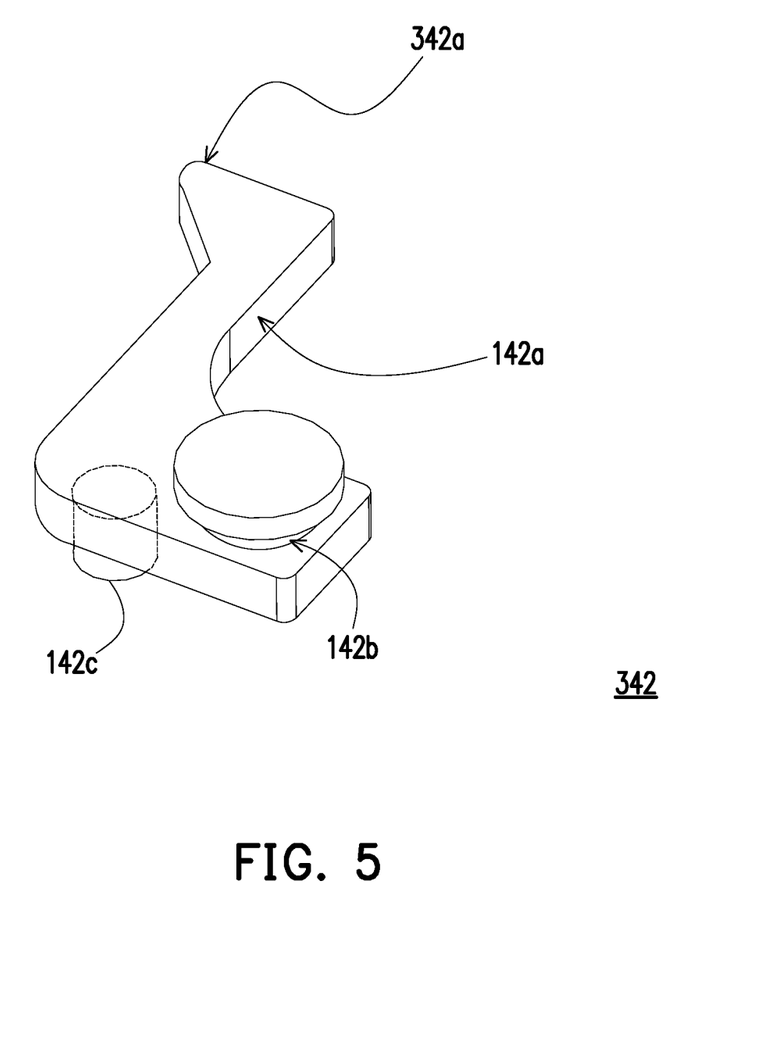
FIG. 5 is a schematic view of a driving member according to another embodiment of the disclosure.

FIG. 5 is a schematic view of a driving member according to another embodiment of the disclosure. Different from the engaging member LT, which is composed of the elastic arm 141 and the driving unit 142, referring to FIG. 5, an engaging member 342 of the embodiment consolidates the component features of the above embodiment on a single structure. As shown in FIG. 5, in addition to having the same driving ends 142a and 142b and shaft portion 142c as the driving unit 142, the engaging member 342 of the embodiment also has a hook 342a at the end, which can generate the same effect as the end hook 141a of the elastic arm 141, that is, to move in or move out the lock hole 123 of the moving member 120 to generate the required lock state and unlock state.

Figure 6:
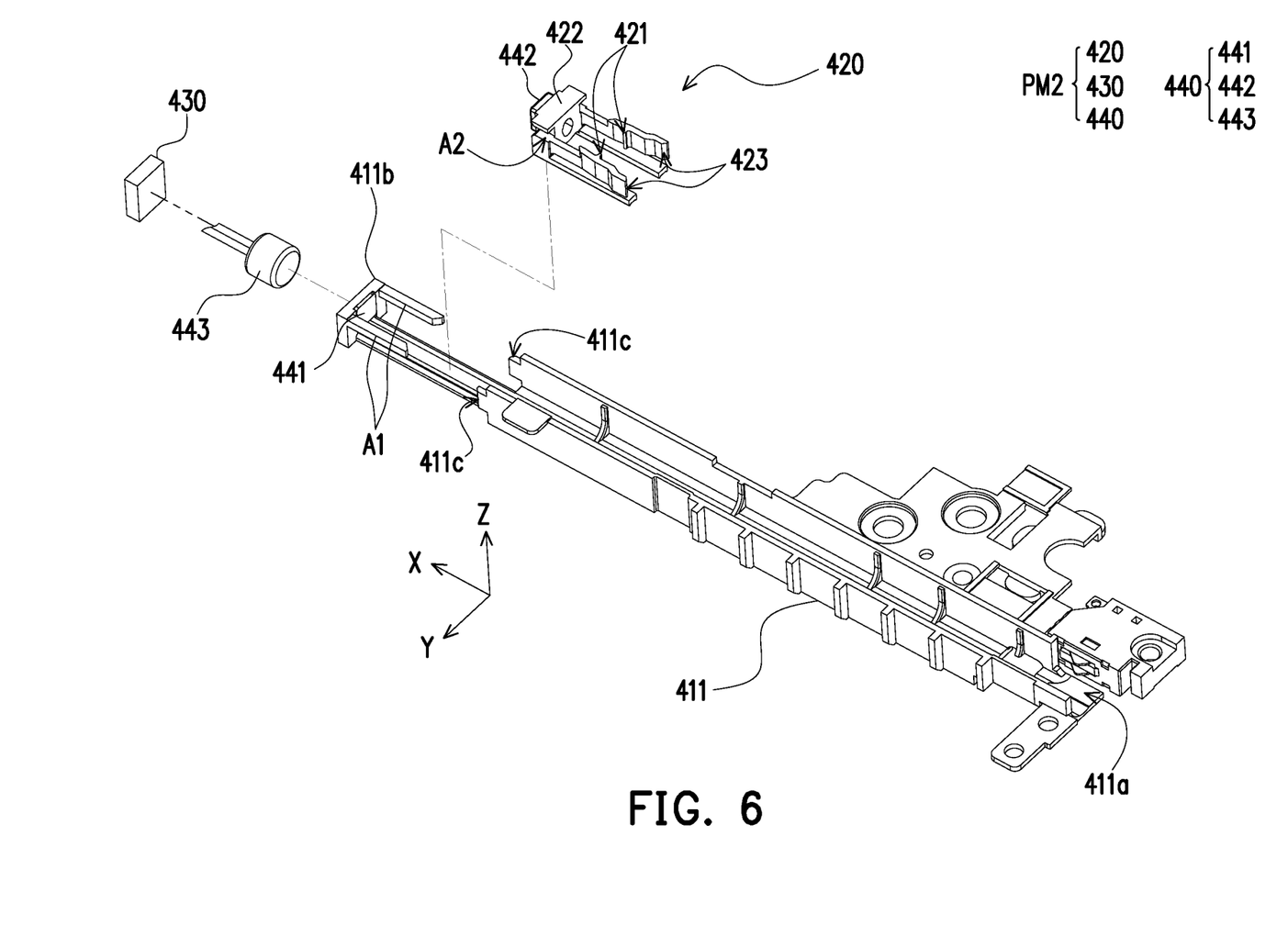
FIG. 6 is an exploded view of a pick-and-place mechanism according to another embodiment of the disclosure.
Figure 7:
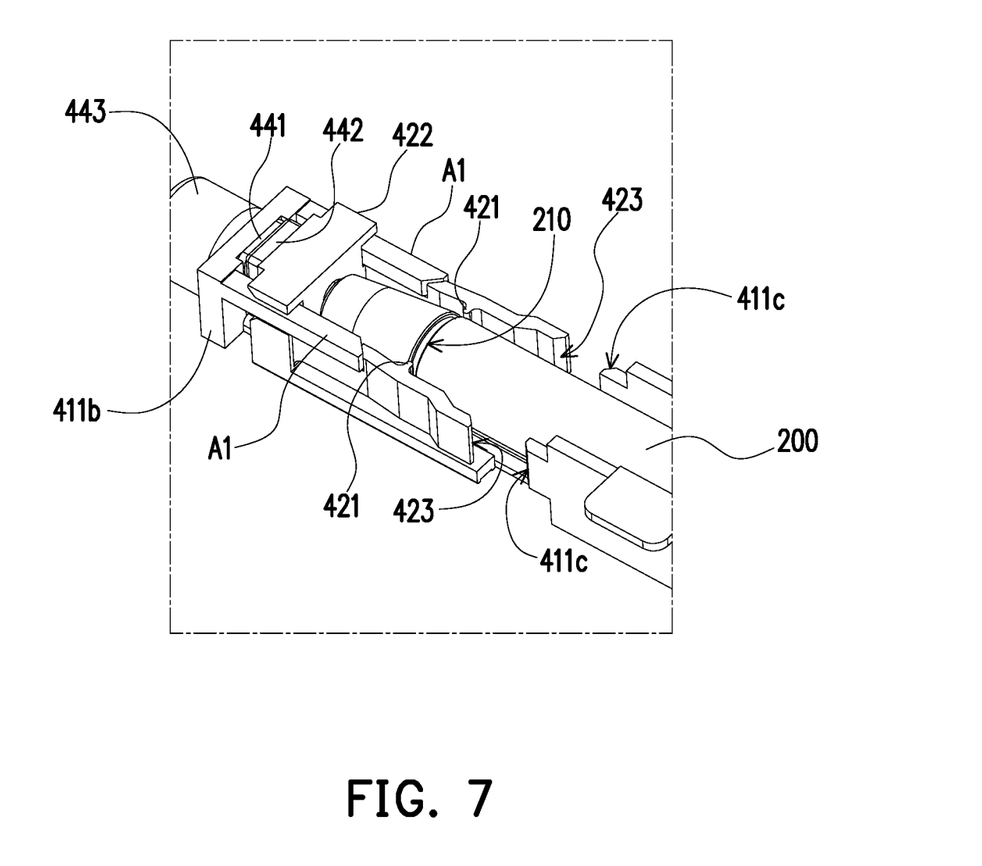
FIG. 7 is a partial enlarged view of the pick-and-place mechanism of FIG. 6 when accommodating a stylus.
Figure 8A:
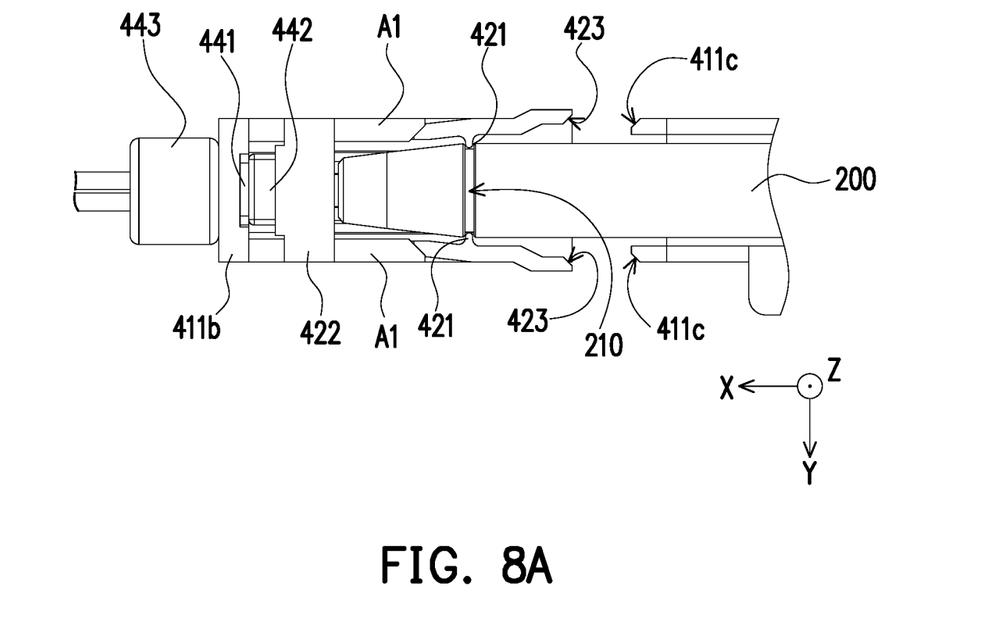
FIG. 8A and FIG. 8B illustrate a pick-and-place process of the stylus with partial enlarged views.
Figure 8B:
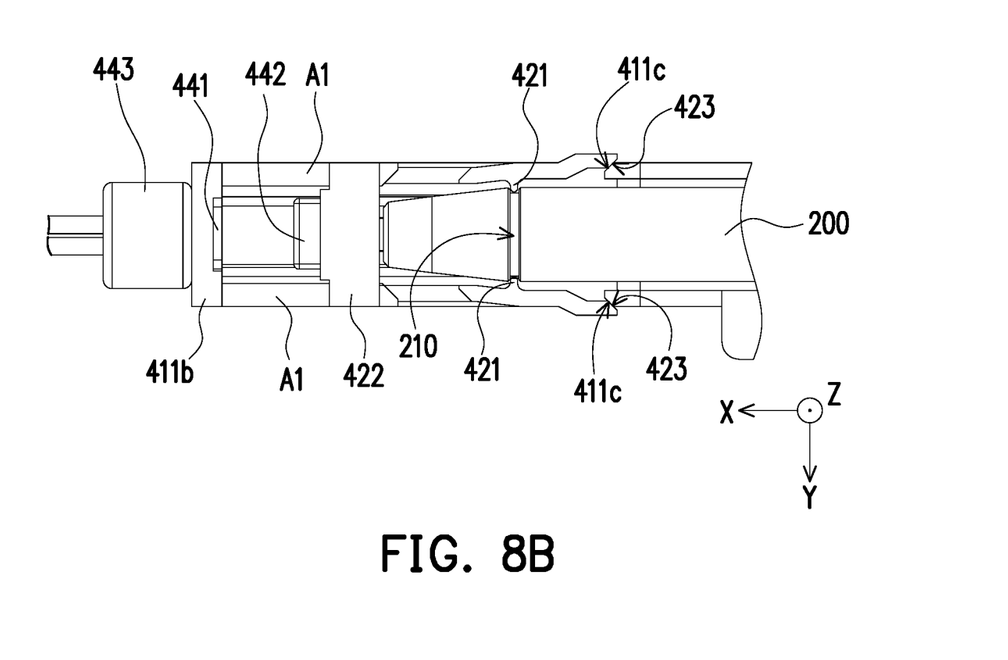

FIG. 6 is an exploded view of a pick-and-place mechanism according to another embodiment of the disclosure. FIG. 7 is a partial enlarged view of the pick-and-place mechanism of FIG. 6 when accommodating a stylus. Please refer to FIG. 6 and FIG. 7 at the same time. In the embodiment, a pick-and-place mechanism PM2 includes a moving member 420, a latch assembly 440, and a switch element 430, the relative relationship thereof is the same as the above embodiment, and the stylus 200 is adapted to enter and exit a base 411 through an entrance 411a of the base 411. The difference is that the latch assembly 440 of the embodiment includes a magnetic conductive member 441, a magnetic member 442, and an electromagnet module 443. The magnetic conductive member 441 is, for example, made of a material with magnetic conductivity, which is disposed in the housing 110 and is substantially located on an inner wall 411b of the base 411. The magnetic member 442 is, for example, a permanent magnet, which is disposed on a front wall 422 of the moving member 420, and the moving member 420 is movably disposed on the base 411. As shown in FIG. 6 and FIG. 7, the base 411 has a pair of arm portions A1 extending from the inner wall 411b. The moving member 420 disposed on the base 411 enables the arm portions A1 to pass through a pair of recesses A2 beside the front wall 422, so that the two generate a guiding effect with relative sliding. The magnetic conductive member 441 and the magnetic member 442 are both located on the X-axis and are on the moving paths of each other. Therefore, the magnetic member 442 moves along with the moving member 420 and generates magnetic attraction when moving close to the magnetic conductive member 441. FIG. 8A and FIG. 8B illustrate a pick-and-place process of the stylus with partial enlarged views. Please refer to FIG. 6, FIG. 7, and FIG. 8A, which show the lock state where the moving member 420 and the magnetic conductive member 441 are moved close to each other to be magnetically attracted.

Next, please refer to FIG. 6 and FIG. 8B. The electromagnet module 443 of the embodiment is disposed on a back side of the inner wall 411b of the base 411 to back face from the magnetic conductive member 441, so that the magnetic member 442, the magnetic conductive member 441, and the electromagnet module 443 are located on the same straight line (the X-axis), and the magnetic conductive member 441 is located between the magnetic member 442 and the electromagnet module 443. The electromagnet module 443 is electrically connected to the switch element 430, and the electromagnet module 443 substantially includes an electromagnet body (not shown) and a power supply unit (not shown). The power supply unit is electrically connected between the switch element 430 and the electromagnet body. In this way, the user can turn on or off the power supply unit through the switch element 430 to energize or deenergize the electromagnet body. When energizing, the electromagnet module 443 of the embodiment generates a magnetic force, and in particular, generates a magnetic force opposite to the magnetism of the magnetic member 442, that is, generates a magnetic repulsion on the magnetic member 442, and the magnetic repulsion is greater than the magnetic attraction between the magnetic member 442 and the magnetic conductive member 441. At this time, the electromagnet module 443 is equivalent to magnetically attracting the magnetic conductive member 441 and magnetically repelling the magnetic member 442. Accordingly, the magnetic repulsion can drive the moving member 420 and the stylus 200 thereon to cancel the bottoming (lock) state shown in FIG. 8A and switch to the unlock state, that is, the magnetic member 442 and the magnetic conductive member 441 are separated from each other, so that at least part of the stylus 200 is moved out of the housing 110 (may refer to FIG. 1).

On the other hand, the moving member 420 of the embodiment is similar to the moving member 120 and has a hook 421 for locking the stylus 200. The moving member 420 also enables the hook 421 to be locked with the circular recess 210 of the stylus 200 when the moving member 420 and the stylus 200 reach the bottom (the magnetic member 442 and the magnetic conductive member 441 are magnetically attracted to each other and are in contact with each other). It is also worth mentioning that the base 411 of the embodiment also has a pushing inclined surface 411c, which is located on the moving path of the hook 421. The moving member 420 also has a pushing inclined surface 423 formed from the hook 421. Therefore, in the unlock state, as shown in FIG. 8B, the pushing inclined surface 411c interferes with the hook 421 in structure, and due to the pushing inclined surfaces 411c and 423 pushing against each other (while the other side of the hook 421 is supported by the arm portion A1), a pair of hooks 421 can be respectively elastically deformed toward the positive and negative Y-axis directions, that is, the pushing inclined surface 411c of the base 411 stretches the hooks 421 to drive the hooks 421 to move away from the circular recess 210 to release the stylus 200.

In summary, in the embodiments of the disclosure, the pick-and-place mechanism for the stylus is applicable for the portable electronic device. The portable electronic device has the housing. The pick-and-place mechanism for the stylus includes the moving member, the latch assembly, and the switch element. The moving member is movably disposed in the housing. The stylus is adapted to be inserted into the housing and locked with the moving member to move synchronously. The latch assembly is disposed in the housing and switches between the lock state and the unlock state. In the lock state, the latch assembly locks the stylus in the housing. In the unlock state, the latch assembly moves at least part of the stylus out of the housing. The switch element is electrically connected to the latch assembly to drive the latch assembly to switch between the lock state and the unlock state.

In one of the embodiments, the latch assembly provides the lock state to the moving member through the engaging member, so that the user can change the length of the memory alloy wire through the switch element to drive the engaging member, and the engaging member releases the moving member to switch to the unlock state. In another embodiment, the latch assembly enables the moving member and the base to reach the bottom and be magnetically attracted to each other by the magnetic attraction, so that the user can activate an electromagnet through the switch element, thereby destroying the magnetic attraction, so as to release the moving member to form the unlock state.

Regardless of the above embodiments, the disclosure generates the required picking and placing of the stylus through electrical control measures, thereby improving the convenience of the user during operation to prevent the occurrence of mistouch.

What is claimed is:

1. A pick-and-place mechanism for a stylus, applicable for a portable electronic device, wherein the portable electronic device has a housing, the pick-and-place mechanism for the stylus comprising:
   a moving member, movably disposed in the housing, wherein the stylus is adapted to be inserted into the housing and locked with the moving member to move synchronously;
   a latch assembly, disposed in the housing and switching between a lock state and an unlock state, wherein in the lock state, the latch assembly locks the stylus in the housing, and in the unlock state, the latch assembly moves at least part of the stylus out of the housing; and
   a switch element, electrically connected to the latch assembly to drive the latch assembly to switch between the lock state and the unlock state,
   wherein the latch assembly comprises:
      a magnetic conductive member, disposed in the housing;
      a magnetic member, disposed on the moving member and moved close to or away from the magnetic conductive member along with the moving member, wherein the magnetic member and the magnetic conductive member generate a magnetic attraction when moving close to each other to attract each other to form the lock state; and
      an electromagnet module, disposed in the housing and electrically connected to the switch element, wherein after the switch element activates the electromagnet module, the electromagnet module generates a magnetic repulsion on the magnetic member, and the magnetic repulsion is greater than the magnetic attraction to push the moving member and the stylus thereon away from the magnetic conductive member to form the unlock state,
      wherein in the unlock state, the electromagnet module magnetically attracts the magnetic conductive member and magnetically repels the magnetic member.

2. The pick-and-place mechanism for the stylus according to claim 1, wherein the moving member has a hook, and the stylus is locked by the hook after being moved into the housing.

3. The pick-and-place mechanism for the stylus according to claim 2, wherein the switch element is located on a moving path of the moving member, and the moving member abuts against the switch element when the stylus and the moving member reach a bottom.

4. The pick-and-place mechanism for the stylus according to claim 2, wherein the housing has a pushing inclined surface located on a moving path of the hook, and in the unlock state, the pushing inclined surface interferes with the hook in structure to drive the hook to release the stylus.

5. The pick-and-place mechanism for the stylus according to claim 1, wherein the latch assembly comprises:
   an engaging member, movably disposed in the housing and located on a moving path of the moving member;
   a power supply element, disposed in the housing and electrically connected to the switch element; and
   a memory alloy wire with one end connected to the engaging member and other end fixed to the housing and electrically connected to the power supply element, wherein the memory alloy wire is energized and changes length due to the switch element activating the power supply element, so that the engaging member is locked with the moving member to reach the lock state or the engaging member is moved away from the moving member to reach the unlock state.

6. The pick-and-place mechanism for the stylus according to claim 5, wherein the engaging member comprises an elastic arm and a driving unit, and the driving unit is pivoted in the housing and has two driving ends, wherein one of the driving ends is connected to the memory alloy wire, other one of the driving ends abuts against the elastic arm, a change in length of the memory alloy wire drives the driving unit to rotate, and drives an end hook of the elastic arm to move into or out of a lock hole of the moving member.

7. The pick-and-place mechanism for the stylus according to claim 6, wherein the elastic arm is an extension structure of the housing.

8. The pick-and-place mechanism for the stylus according to claim 6, wherein during a process of the stylus moving into the housing, when the stylus and the moving member reach a bottom, the end hook falls into the lock hole.

9. The pick-and-place mechanism for the stylus according to claim 5, wherein the latch assembly further comprises an elastic member abutting between the housing and the moving member, in the lock state, the elastic member is deformed by pressing of the moving member and the housing to accumulate an elastic force, and in the unlock state, the elastic force of the elastic member drives the moving member, so that at least part of the stylus on the moving member is exposed from the housing.

10. The pick-and-place mechanism for the stylus according to claim 1, wherein the moving member has a hook, the stylus is moved into the housing and is locked by the hook when reaching a bottom, and the magnetic member contacts and magnetically attracts the magnetic conductive member.

11. The pick-and-place mechanism for the stylus according to claim 1, wherein the magnetic member, the magnetic conductive member, and the electromagnet module are located on a same straight line, and the magnetic conductive member is located between the magnetic member and the electromagnet module.

* * * * *